UNITED STATES PATENT OFFICE.

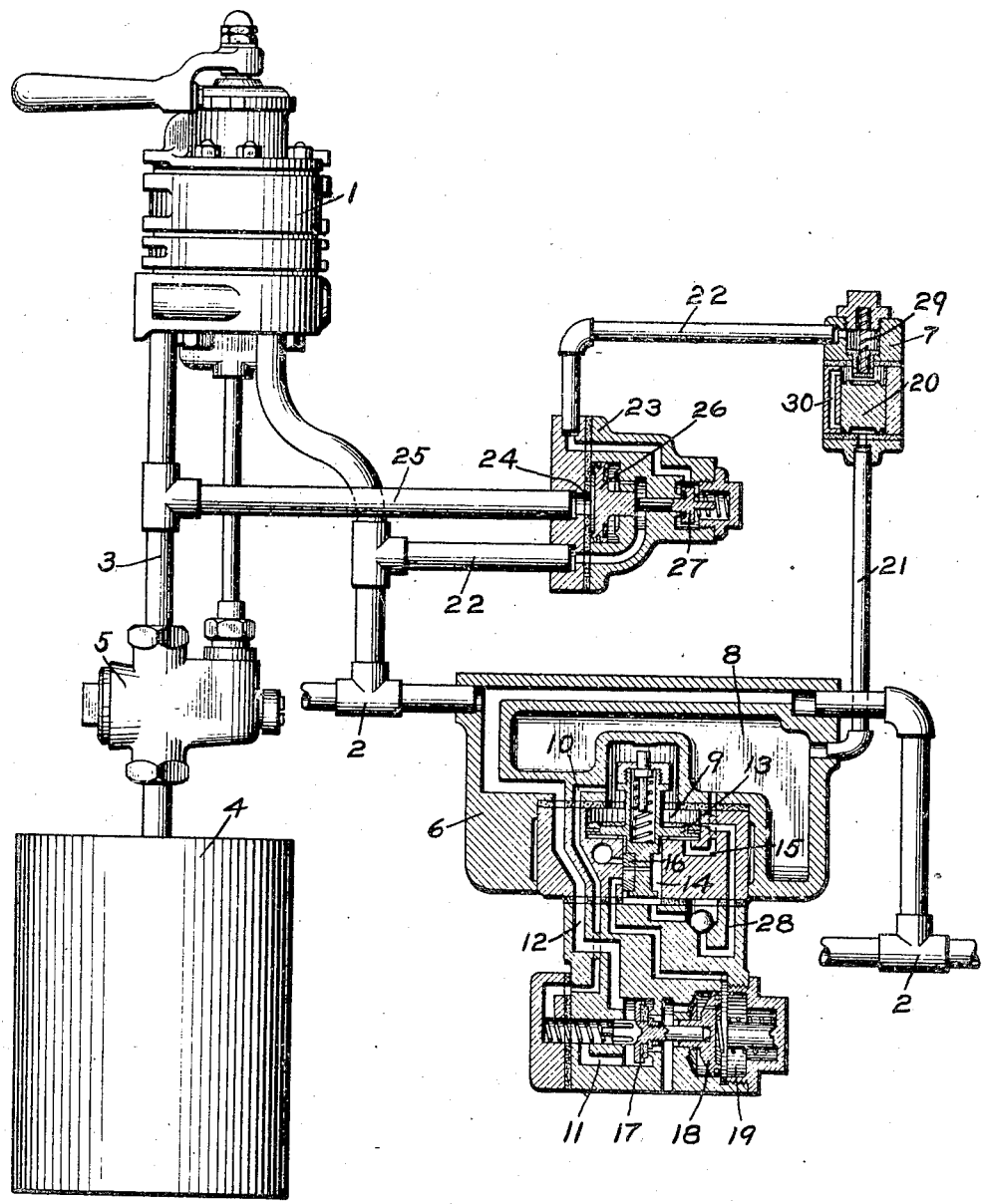

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE DEVICE.

1,299,270.     Specification of Letters Patent.     Patented Apr. 1, 1919.

Application filed May 4, 1918. Serial No. 232,440.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a brake equipment in which a brake pipe vent valve device is employed for effecting a quick local reduction in brake pipe pressure.

Where a brake pipe vent valve device is employed of the type having a piston subject to the opposing pressures of the brake pipe and a chamber adapted to be charged from the brake pipe, there is a difficulty, particularly if the vent valve device is close to the operating brake valve, that when fluid under pressure is rapidly supplied to the brake pipe in releasing the brakes, as in the full release position of the brake valve, the chamber of the vent valve device is liable to be over-charged with fluid under pressure, so that upon movement of the brake valve to running position, the reduction in pressure in the brake pipe, due to equalization of fluid pressure throughout the brake pipe, is apt to create a sufficient differential pressure with respect to the chamber of the vent valve device, so as to cause an undesired emergency action of the vent valve device.

According to my prior application, Serial No. 153544, filed March 9, 1917, the above difficulty is obviated by providing a valve device for automatically equalizing the fluid pressure in the chamber of the vent valve device with the brake pipe pressure, in case the chamber becomes overcharged in releasing the brake, while not interfering with the desired emergency action, when a sudden reduction in brake pipe pressure is made.

In some cases, in order to make it possible to initiate an emergency application of the brakes from any locomotive in double or multiple heading, the usual cut-out cock in the brake pipe connection to the brake valve is omitted and instead, a cut-out cock is placed in the main reservoir connection to the brake valve.

Where this arrangement is employed in connection with a vent valve device and the cut-off valve device of the above mentioned prior patent application, if an emergency reduction in brake pipe pressure is initiated on one locomotive in multiple heading, the vent valve devices on the other locomotives are so remote from the operating locomotive that the rate of reduction in brake pipe pressure may not be rapid enough to insure the movement of the cut-off valve so as to cut off connection from the vent valve chamber to the brake pipe. The pressure in the chamber will then bleed down through the cut-off valve to the brake pipe and thus prevent the emergency action of the vent valve device.

The principal object of the present invention is to provide means for obviating the above difficulty.

In the accompanying drawing, the single figure is a diagrammatic view, partly in section, of a locomotive brake equipment, with my invention applied thereto.

As shown in the drawing, the apparatus may comprise an engineer's brake valve 1 connected to the usual brake pipe 2 and having a pipe 3, connected to main reservoir 4, and containing a cut-out cock 5.

A vent valve device 6 is interposed in the brake pipe 2 and a cut-off valve device 7 controls the venting of fluid from the chamber 8 of the vent valve device to the brake pipe 2.

As shown in the drawing, the vent valve device 6 may be similar to that shown in my prior application, hereinbefore referred to, although my improvement may be employed in connection with various other types of vent valve devices.

In this instance, the vent valve device comprises a casing having a piston chamber 9 connected through passages 10, 11, and 12 with the brake pipe 2 and containing a piston 13 and a valve chamber 14 connected by passage 15 to chamber 8 and containing a valve 16 adapted to be operated by piston 13.

A valve 17 is provided for venting fluid from the brake pipe and said valve is adapted to be operated by a piston 18, the operation of which is controlled by varying the pressure in piston chamber 19, through the action of valve 16.

The cut-off valve device 7 comprises a casing containing a double check valve 20, having one side connected by pipe 21 to chamber 8 and the opposite side to a pipe 22 which is adapted to communicate with the brake pipe 2.

According to my present invention, there is interposed in the pipe 22, a valve device 23 comprising a casing, having a piston chamber 24, connected by pipe 25 to the main reservoir pipe 3, and containing a piston 26. Said piston is adapted to operate a valve 27 which controls communication through the pipe 22 to the brake pipe 2.

In operation, the valve chamber 14 and chamber 8 are normally charged with fluid pressure from the brake pipe through piston chamber 9 and passages 28 and 15, so that fluid pressures on opposite sides of the piston 13 are normally equalized and said piston remains in its release position, as shown in the drawing.

If the locomotive is the operative locomotive, the cut-out cock 5 is turned to its open position, in which the main reservoir 4 is connected to the brake valve device 1 and fluid from the main reservoir pipe 3 will then be supplied through pipe 25 to piston chamber 24. The piston 26 is consequently shifted so as to maintain the valve 27 in open position, establishing communication through pipe 22, from the cut-off valve device 7, to the brake pipe 2.

With the pipe 22 open to the brake pipe, if the chamber 8 should become overcharged with fluid under pressure in releasing the brakes, as the brake pipe pressure gradually falls below this pressure, the double check valve 20 will be operated by the higher pressure in chamber 8, so as to engage the spring stop 29 and open a by-pass 30 around said valve, so that the excess pressure in chamber 8 is vented to the brake pipe and unintended action of the vent valve device is prevented.

If a sudden reduction in brake pipe pressure is made to effect an emergency application of the brakes, the rate of reduction in brake pipe pressure being greater than the rate at which the pressure in chamber 8 can reduce through the by-pass passage 30, the double check valve 20 will be shifted to its outer seat, cutting off communication through the passage 30. Since fluid cannot flow from the chamber 8 to the brake pipe, the action of the vent valve device to effect a local reduction in brake pipe is not interfered with.

On the non-operating locomotives, the cut-out cock 5 is turned to its closed position, and since main reservoir pressure will then be cut off from the piston 26, said piston will be operated by brake pipe pressure on the opposite side so as to permit the valve 27 to close.

The brake pipe being thus cut off from the double check valve 20, the same will be cut out of operation on the non-operating locomotives, so that the slower rate of reduction in brake pipe pressure in an emergency application due to the locomotive being remote from the operating brake valve cannot be effective to cause the possible movement of the cut-off valve device to its position for opening the by-pass 30, which would tend to prevent the emergency action of the vent valve device 6, by permitting the equalization of pressure in chamber 8 into the brake pipe.

Having now described my invention, what I claim as new, and desire to secure by Letters Patent, is:

1. In a fluid pressure brake, the combination with a valve device subject to the opposing pressures of the brake pipe and a chamber, and valve means operated according to the pressure in said chamber for venting fluid from said chamber, of means for automatically preventing the operation of said valve means.

2. In a fluid pressure brake, the combination with a valve device subject to the opposing pressures of the brake pipe and a chamber, and valve means subject to the opposing pressures of the brake pipe and said chamber and operated upon an increase in pressure in said chamber, above the brake pipe pressure, for venting fluid from the chamber to the brake pipe, of means for automatically cutting off communication from said valve means to the brake pipe.

3. In a fluid pressure brake, the combination with a brake pipe, a brake valve, a main reservoir adapted to be connected to the brake valve, a valve device subject to the opposing pressures of the brake pipe and a chamber for venting fluid from the brake pipe, and valve means for venting fluid from said chamber to the brake pipe, of means controlled by main reservoir pressure for cutting said valve means out of action.

4. In a fluid pressure brake, the combination with a brake pipe, a brake valve, a main reservoir adapted to be connected to the brake valve, a valve device subject to the opposing pressures of the brake pipe and a chamber for venting fluid from the brake pipe, and valve means for venting fluid from said chamber to the brake pipe, of means operated upon cutting off the main reservoir connection to the brake valve for cutting off communication from said valve means to the brake pipe.

5. In a fluid pressure brake, the combination with a brake pipe, a brake valve, a main reservoir adapted to be connected to the brake valve, a valve device subject to the opposing pressures of the brake pipe and a chamber for venting fluid from the brake pipe, and valve means for venting fluid from said chamber to the brake pipe, of means normally subject to main reservoir pressure and operated upon cutting off the supply of fluid from the main reservoir to the brake valve for closing communication from said valve means to the brake pipe.

In testimony whereof I have hereunto set my hand.

WALTER V. TURNER.